United States Patent [19]

Okamoto et al.

[11] Patent Number: 4,723,270

[45] Date of Patent: Feb. 2, 1988

[54] TRAFFIC DATA COLLECTING ARRANGEMENT COMPRISING A TEMPLATE DATA MEMORY IN EACH EXCHANGE

[75] Inventors: Michio Okamoto; Atsushi Tsuchihashi; Yasuo Kobayashi, all of Tokyo, Japan

[73] Assignee: NEC Corporation, Tokyo, Japan

[21] Appl. No.: 929,289

[22] Filed: Nov. 12, 1986

[30] Foreign Application Priority Data

Nov. 11, 1985 [JP] Japan ................................ 60-253054

[51] Int. Cl.$^4$ ............................................... H04M 3/36
[52] U.S. Cl. ..................................... 379/113; 379/134
[58] Field of Search ....................... 379/94, 112–113, 379/133–137

[56] References Cited

U.S. PATENT DOCUMENTS 4,456,788 6/1984 Kline et al. ......................... 379/137
4,464,543 8/1984 Kline et al. ......................... 379/224

OTHER PUBLICATIONS

Moor et al., "From Cameras and Registers to Real-Time Traffic Data", *Telephony,* Jul. 18, 1983, pp. 52, 57 and 60.

*Primary Examiner*—Thomas W. Brown
*Assistant Examiner*—Mark E. Ham

*Attorney, Agent, or Firm*—Schwartz, Jeffery, Schwaab, Mack, Blumenthal & Evans

[57] ABSTRACT

In each exchange (12) of a communication network, a template data memory (31) keeps "exchange" template data according to which traffic data should be monitored at the exchange. In a center (11) of the network, a template data file (33) keeps copies of the template data of the respective exchanges of the network as "center" template data. When a change in the exchange template data is transmitted from a "change" originating exchange to the center, a central processor (13) updates the center template data accordingly for the originating exchange. Traffic data are transmitted from the respective exchanges to the center without the exchange template data. When such a traffic datum is transmitted from a "data" originating exchange to the center, the central processor stores the traffic datum in a traffic data log file (17) according to the template data kept in the template data file for the data originating exchange. Preferably, the center comprises a table (32) for keeping a code upon completion of renewal of the center template data for the change originating exchange until the center template data are again updated for the exchange in question. With reference to the code, the central processor loads the traffic data log file with the traffic data transmitted from the change originating exchange which is the data originating exchange in this event.

5 Claims, 10 Drawing Figures

FIG. 2

| 311 | 312 | 313 | 314 |
|---|---|---|---|
| 01 (ITEM IDENTIFICATION CODE) | 67 (DATA LENGTH) | 016 (ITEM NUMBER) | AAAA BBBB CCCC --- NNNN OOOO PPPP (ROUTE CODES) |

36 — NOV. 11'85 MON 11:00    PL3
..711 TRAFFIC DATA OUTPUT (HR) START

37 — # TRUNK GROUP PEG COUNT #

38 —
0038393 0001623 0012347 0012327 0009231 0095536 0000010
0233135 0000000 0045324 0000000 0000023 0000000 0000000
0000003 0000000

39 — NOV. 11'85 MON 11:00    PL3
.. 712 TRAFFIC DATA OUTPUT (HR) END

| 331 | 332 | 333 | 334 | 335 |
|---|---|---|---|---|
| PL3 (OFFICE CODE) | 01 | 67 | 016 | AAAA BBBB CCCC --- NNNN OOOO PPPP |

33

```
PL3  NOV. 11'85 MON 11:00
#.. 711 TRAFFIC DATA OUTPUT (HR) START

TRUNK GROUP PEG COUNT (TRUNK HUNT OK)

AAAA=0038393 BBBB=0001623 CCCC=0012347 DDDD=0012327
EEEE=0009231 FFFF=0095536 GGGG=0000010 HHHH=0233135
IIII=0000000 JJJJ=0045324 KKKK=0000000 LLLL=0000023
MMMM=0000000 NNNN=0000000 OOOO=0000003 PPPP=0000000

|
              |

#.. 712 TRAFFIC DATA OUTPUT (HR) END
              |
              |
```

TRAFFIC DATA COLLECTING ARRANGEMENT COMPRISING A TEMPLATE DATA MEMORY IN EACH EXCHANGE

BACKGROUND OF THE INVENTION

This invention relates to a traffic data collecting or accumulating arrangement for a communication network which comprises a plurality of exchanges and administering or traffic file center.

A traffic data collecting arrangement of the type described, is already known. For example, a telecommunication network with such a facility is disclosed in U.S. Pat. No. 4,464,543 issued to Samuel J. Kline et al.

In such a traffic data collecting arrangement, an optional one of the exchanges of the network is similar in operation to others of the exchanges insofar as this invention is concerned. Attention will therefore be directed mainly to only one of the exchanges that will very often be referred to simply as an exchange in the following.

For a conventional traffic data collecting arrangement, the exchange comprises a monitoring arrangement for carrying out monitoring or measurement of traffic data of the exchange from time to time as monitored data according to items used in the monitoring. The monitored data are temporarily stored in a traffic data memory. Periodically, such as hourly, a modem transmits the memorized data to the administrating center through a data link of the network as transmitted traffic data.

The administrating center includes modems for the respective exchanges of the network. In this manner, the exchange and the administrating center comprise units or elements which are similarly named. Moreover, the exchange and the administrating center deal with data or items which have like names. The units and the data of the exchange will therefore be called with the word "exchange" used as a modifier. Likewise, the units and the data of the administrating center will be called with the word "center" used as another modifier.

The administrating center comprises a traffic data log file. The center modems receive the transmitted traffic data from the exchanges of the network as received traffic data. The traffic data log file is for accumulating the received traffic data as accumulated traffic data together with dates and time of reception of the transmitted traffic data as the received traffic data. The dates and time are for later use of the accumulated traffic data.

Although the exchanges of the network are similarly operable, the items may differ for a certain exchange from others. A change is not seldom in the items for which the traffic data should be monitored at each exchange. The memorized data have therefore been transmitted as the transmitted traffic data in a conventional traffic data collecting arrangement together with the items in each instance of transmission. This results in an increased amount of data transmission. The data link is rendered busy during a long holding time. The administrating center is undesirably given a low capability of accumulating the received data as the accumulated data.

SUMMARY OF THE INVENTION

It is therefore an object of the present invention to provide a traffic data collecting arrangement whereby it is unnecessary to transmit, in each instance of transmission of traffic data from an exchange to an administrating center, items for which the traffic data are monitored at the exchange.

It is another object of this invention to provide a traffic data collecting arrangement of the type described, wherein a data link between the exchange and the administrating center is not rendered busy during a long holding time in each instance of transmission of the traffic data.

It is still another object of this invention to provide a traffic data collecting arrangement of the type described, wherein the administrating center has a data collecting capability raised to its utmost.

A traffic data collecting arrangement to which this invention is applicable, is for a communication network which comprises a plurality of exchanges and an administrating center wherein each exchange includes monitoring means for monitoring traffic data of the exchange under consideration as monitored data, a traffic data memory for memorizing the monitored data as memorized data, and an exchange modem and wherein the administrating center includes center modems for the respective exchanges of the network and a traffic data log file. According to this invention, each exchange comprises a template data memory for memorizing exchange template data, and exchange control means coupled to the template data memory, the monitoring means, the traffic data memory, and the exchange modem for making the monitoring means monitor the traffic data according to the exchange template data and for making the exchange modem transmit the memorized data to the administrating center successively as tranmitted traffic data and furthermore transmit a change notice to the administrating center whenever one of the exchange template data is changed to a changed datum. The center modems receive the transmitted traffic data of the exchanges of the network as received traffic data. The center modem for the exchange under consideration receives the change notice as a received notice. The administrating center comprises center control means coupled to the center modems for making the center modem for the exchange under consideration transmit a request signal to the exchange under consideration in response to the received notice. The exchange control means is furthermore for making the exchange modem transmit the changed datum to the administrating center as a transmitted template datum when the exchange modem receives the request signal. The center modem for the exchange under consideration receives the transmitted template datum as a received template datum. The administrating center further comprises a template data file for memorizing center template data which correspond to the exchange template data of the exchanges of the network. The center control means is furthermore coupled to the template data file to update the template data file by substituting the received template datum for one of the center template data that corresponds to the above-mentioned one of the exchange template data. The center control means is still further coupled to the traffic data log file to accumulate the received traffic data in the traffic log file as accumulated traffic data according to the center template data.

BRIEF DESCRIPTION OF THE DRAWING

FIG. 2 shows a template data memory used in the traffic data collecting arrangement illustrated in FIG. 1;

FIG. 3 shows images of data stored in a buffer memory block used in the traffic data collecting arrangement depicted in FIG. 1;

DESCRIPTION OF THE PREFERRED EMBODIMENT

Figure 1:
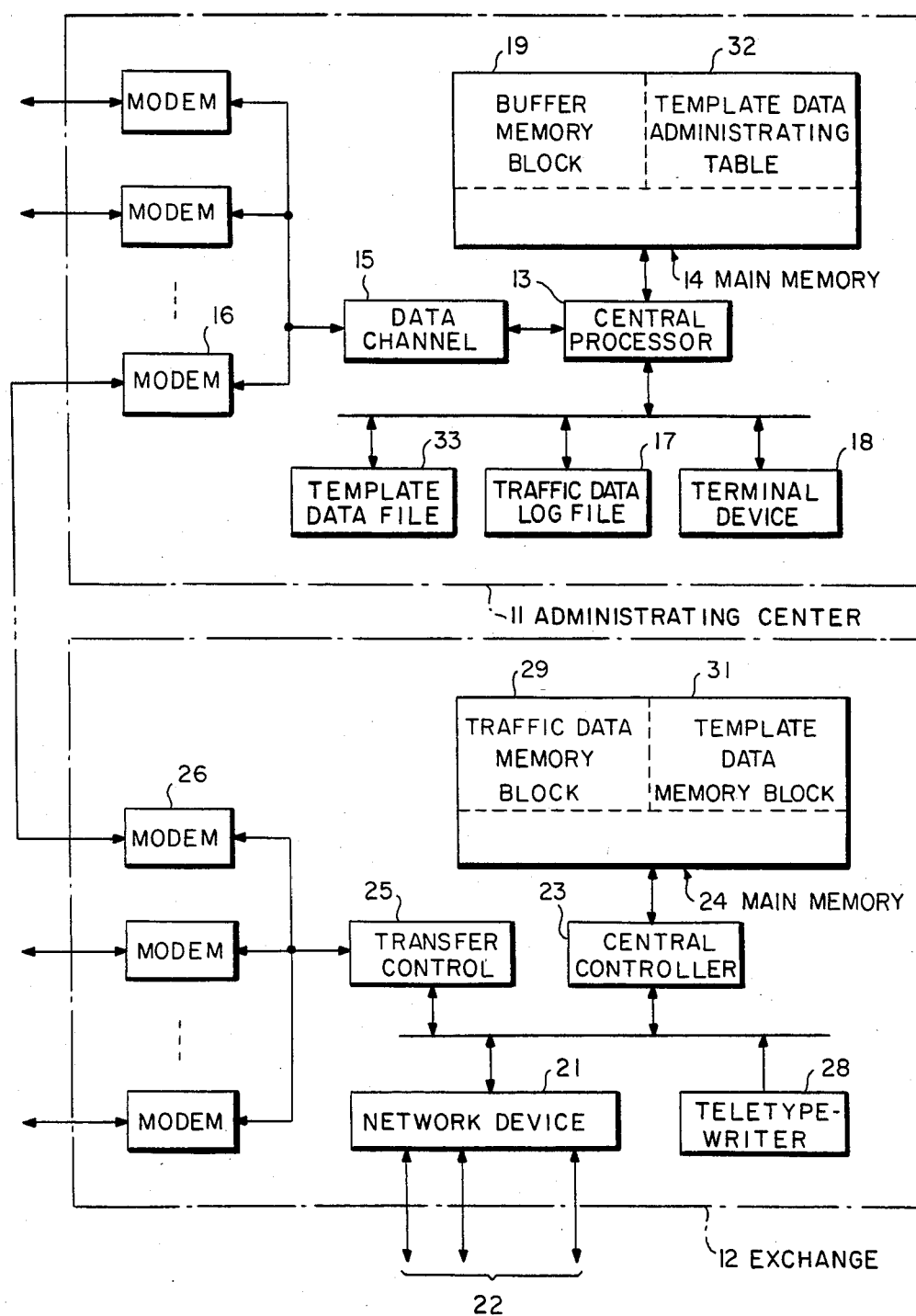
FIG. 1 is a block diagram of a communication network which comprises a traffic data collecting arrangement according to an embodiment of the instant invention.

Referring to FIG. 1, a traffic data collecting or accumulating arrangement is for a communication network which comprises a plurality of exchanges in central offices and an administrating or traffic file center 11 in a separate office. The administrating center 11 may alternatively be installed in one of the central offices that comprises one or more exchanges. Each exchange is similar in operation to others of the exchanges insofar as the present invention is concerned. Only one of the exchanges is therefore depicted as an electronic exchange at 12.

The administrating center 11 comprises a central processing unit 13 and a main memory 14 therefor. The main memory 14 is herein called a center memory for the reason described heretobefore. The central processing unit 13 is connected to a plurality of modems through a data channel device 15. The modems of the administrating center 11 are connected to the respective exchanges of the communication network through data links of the network and are named center modems. One of the center modems is indicated at 16. The center modem 16 is connected to the exchange 12 through one of the data links. A traffic data log file 17 and a supervisory terminal device 18 are connected to the central processing unit 13 through a common bus. In addition to control programs for the central processing unit 13, traffic data accumulating and traffic data producing programs are memorized in the center memory 14 for the traffic data log file 17 and the supervisory terminal device 18. Controlled by the traffic data producing programs, the central processing unit 13 makes the supervisory terminal device 18 display, print, or otherwise produce traffic data which are accumulated in the traffic data log file 17 according to the traffic data accumulating programs as will become clear as the description proceeds. The supervisory terminal device 18 includes a teletypewriter which is operable by an attendant to the administrating center 11. In this manner, a combination of the central processing unit 13, the center memory 14, the traffic data log file 17, and the supervisory terminal device 18 serves as a data processor. The central processing unit 13 serves as a center control arrangement. The center memory 14 has a buffer memory block 19 for the purpose which will presently become clear.

The exchange 12 comprises a network device 21 connected to subscriber substations and like subscriber terminal equipments (not shown) of the exchange 12 under consideration through speech and data channels which are only partly depicted at 22. The network device 21 is connected to a central control unit 23 through a common bus and a main memory 24 through the central control unit 23. A plurality of modems are connected to the common bus through a data transfer control device 25. The main memory 24 and the modems of the exchange 12 are herein termed an exchange memory and exchange modems. One of the exchange modems is connected to the center modem 16 through the data link and is designated by a reference numeral 26. Other exchange modems are connected to similar exchange modems of other exchanges of the network. A teletypewriter 28 is connected to the common bus.

In addition to control programs for the central control unit 23, traffic data collecting programs are memorized in the exchange memory 24. The exchange memory 24 therefore serves as a main element of a monitoring arrangement for monitoring or measuring traffic data of the exchange 12 as monitored data. A block of the exchange memory 24 is used as a traffic data memory block 29 for temporarily memorizing the memorized data as memorized data. The central control unit 23 reads the monitored data as read data from the traffic data memory block 29 periodically, such as hourly, and makes the exchange modem 26 transmit the read data to the center modem 16 through the data link as transmitted traffic data. The central control unit 23 therefore serves as an exchange control arrangement coupled to the traffic data memory block 29 and the exchange modem 26 to make the exchange modem 26 transmit the memorized data from the traffic data memory block 29 to the administrating center 11 as the transmitted traffic data. The traffic data memory block 29 ordinarily has two memory segments or sections which are alternatingly used in memorizing the monitored data as the memorized data. The two memory segments collectively serve as a traffic data memory.

The center modems, such as the center modem 16, receive such transmitted traffic data from the exchanges of the network as received traffic data. The central processing unit 13 stores the received traffic data through the buffer memory block 19 in the traffic data log file 17 as accumulated traffic data in the manner which will later be described more in detail. The central processing unit 13 is coupled in this manner to the center modems and the traffic data log file 17 to accumulate the received traffic data of the respective exchanges in the traffic data log file as the accumluated traffic data.

It is well known in the art that the exchanges are discriminated one from others usually by names, namely, by exchange names given to the respective exchanges. It is alternatively possible to discriminate an exchange from others by an office or exchange code with or without an area code. It will herein be presumed that one of the exchanges of the network is discriminated from others by the office code assigned to the exchange in question. On the other hand, it is possible for the traffic data transmitted from one of the exchanges of the network to identify that one of the exchanges as a data originating exchange and to know the office code of the data originating exchange by that one of the center modems through which the transmitted traffic data are received. The accumulated traffic data are accompanied in the traffic data log file 17 by such office codes. Furthermore, the accumulated traffic data are accompanied by a data and time of reception of the transmitted traffic data as the received data from each exchange. For this purpose, the central processing unit 13 includes a timing arrangement for generating timing information indicative of the data and time.

In the manner described hereinabove, the traffic data are monitored at each exchange according to items. Each item comprises a heading and a route name given to each of routes for which the traffic data should be monitored at the exchange under consideration. Examples of such headings are TGP (trunk group peg count), TGU (trunk group usage), CNU (concentrator usage), JNU (junctor usage), SBU (subscriber line usage), TOP (TERM office peg count), CBP (subscriber line busy peg count), and CSP (the number of originating calls according to line classes). It is described heretobefore that the items are subject to a change. For example, the routes may be increased or otherwise subjected to a change. Moreover, a new exchange may be added to the communication network.

According to a preferred embodiment of this invention, the traffice data collecting arrangement comprises in the exchange memory 24 a template data memory block 31 for memorizing template data which will shortly become clear. The template data memorized in the template data memory block 31, are herein called exchange template data for the reason described earlier. The items for monitoring the traffic data at the exchange 12, are subjected to a change in the known manner either by the teletypewriter 28 of the exchange 12 or by the teletypewriter in the supervisory terminal device 18. When the items are subjected to a change, the central control unit 23 updates or renews the exchange template data in the template data memory block 31. The exchange template data thereby become what will herein be called current template data. When a new exchange is added to the network, the template data memory block is afresh formed in the exchange memory of the new exchange.

Turning to FIG. 2 for a short while, the template data memory block 31 comprises a plurality of memory sections for the respective headings exemplified above. The memory sections will be identified by a serial number and called a first memory section and so forth. Each memory section is for an exchange template datum and comprises first through fourth memory areas 311, 312, 313, and 314. The first memory area 311 is for a number or code assigned to each heading as an item identification number. The second and the third memory areas 312 and 313 are for a data length and an item number, both of which will presently be described. The fourth memory areas 314 is for codes representative of the route names as route codes, each of which may be a four-bit code. It should be noted in this connection that the item identification number, the data length, the item number, the route codes, and the like for each item identification number are herein referred to collectively as a template datum which is used by the exchanges, such as the exchange 12, and the administrating center 11 of the network in common. Depending on the circumstances, the office code is included in the template datum in the manner which will later be described.

In the example illustrated in FIG. 2, a number 01 is memorized in the first memory area 311 of the first memory section as the item identification number indicative of the truck group peg count TGP as the heading. Four-bit codes AAAA through PPPP, sixteen in number, are memorized in the fourth memory area 314 as the route codes. A number 016 is memorized in the fluid memory area 313 as the item number, namely, the number of route codes memorized in the fourth memory area 314. In the example being illustrated, each item number is a three-digit number. The number of bits or digits memorized in the third and the fourth memory areas 313 and 314, are therefore in total sixty-seven. Consequently, a number 67 is memorized in the second memory area 312 as the data length.

Turning back to FIG. 1, the central control unit 23 is coupled to the template data memory block 31 and the monitoring arrangement to make the monitoring arrangement monitor traffic data of the exchange 12 under consideration as monitored data according to the current template data currently memorized in the template data memory block 31, above all, according to the headings and the route names for each heading. Coupled to the traffic data memory block 29, the central control unit 23 stores the monitored data in the traffic data memory block 29 as memorized data in succession, namely, according to the current template data. Coupled to the exchange modem 26, the central control unit 23 makes the exchange modem 26 transmit the memorized data to the administrating center 11 as transmitted traffic data successively, that is, according to the current template data.

When one of the exchange template data is changed as above in the template data memory block 31 to a changed datum, the central control unit 23 makes the exchange modem 26 transmit a change notice to the administrating center 11. The change notice is an electric signal in practice and indicates the changed datum by the item identification number. It is now understood that the central control unit 23 is coupled to the template data memory block 31 and the exchange modem 26 for making the exchange modem 26 furthermore transmit a change notice to the administrating center 11 whenever one of the exchange template data is changed to a changed datum in the template data memory block 31. When one or more of the exchange template data are changed, the template data memory block 31 will become to memorize some of the exchange template data and one or more changed data. All of such template data are named the current template data earlier. The central control unit 23 is coupled to the monitoring arrangement as pointed out above to make the monitoring arrangement monitor the traffic data according to the current template data in each instance of monitoring.

In the administrating center 11, each center modem receives such a change notice from the exchange connected to the center modem in question. In this manner, the center modems serve collectly to receive the change notice as a received notice from whichever of the exchanges of the network. When supplied with the received notice through one of the center modems, the central processing unit 13 identifies by the center modem in question that one of the exchanges of the network as a notice originating exchange from which the change notice is received as the received notice. The central processing unit 13 moreover makes the center modem under consideration transmit a request signal to the notice originating exchange. It is now understood that the central processing unit 13 is coupled to the center modems, such as the center modem 16, and is responsive to the received notice for making the center modem in question transmit the request signal to the notice originating exchange. Like the change notice, the request signal preferably indicates the item identification number of an exchange template datum which is changed to the changed datum.

If the exchange 12 is the notice originating exchange, the exchange modem 26 receives the request signal as a received signal. Responsive to the received signal, the central control unit 23 makes the exchange modem 26 transmit the changed datum to the administrating center 11 as a transmitted template datum either from the teletypewriter 28 directly or from the template data memory block 31 through the central control unit 23. It is now appreciated that the central control unit 23 is coupled to the template data memory block 31 and the exchange modem 26 to make the exchange modem 26 transmit the changed datum to the administrating center 11 as the transmitted template datum in response to the received signal.

In the administrating center 11, the center modem 16 receives the transmitted template datum. Such transmitted template data will be received from the exchanges of the network in a considerably long interval of time since the template data memory blocks of the exchanges are not frequently changed. The center modems therefore serve to receive the transmitted template data from the exchanges as received template data. Like for the received notice, the central processing unit 13 identifies an originating exchange for each received template datum by that one of the center modems through which the transmitted template datum is received as the received template datum. This originating exchange should be the notice originating exchange for each received notice.

The traffic data collecting arrangement comprises a template data administrating table 32 in the center memory 14. The template data administrating table 32 will later be described in detail. The traffic data collecting arrangement furthermore comprises a template data file 33 which is connected in the administrating center 11 to the common bus for the central processing unit 13, the traffic data log file 17, and the supervisory terminal device 18 and to the buffer memory block 18 and the template data administrating table 32 of the center memory 14 through the central processing unit 13.

On initially putting the traffic data collecting arrangement into operation, copies of the exchange template data of the exchanges of the network are stored, in the manner which will presently be examplified, as center template data in the template data file 33 for the respective exchanges, namely, together with the office codes of the respective exchanges. The center template data therefore correspond to the exchange template data memorized in the template data memory blocks, such as the template data memory block 31, of the respective exchanges. When received as a received template datum from a notice originating exchange, each changed datum is substituted in the template data file 33 by the central processing unit 13 under the control by the template data administrating table 32 for one of the center template data that corresponds to the above-mentioned one of the exchange template data of the notice originating exchange. In this manner, the central processing unit 13 updates or renews the template data file 33 whenever a received notice is followed by a received template datum. In correspondence to the current template data of each exchange, the center template data will be called updated template data after at least one received template datum is substituted for the corresponding center template datum.

Turning to FIG. 3, the buffer memory block 19 of the center memory 14 is for the received traffic due which are transmitted from a data originating exchange of the network as the transmitted traffic data. It will be assumed that the data originating exchange is the exchange 12. It will furthermore be assumed hereafter that each received traffic datum consists of a starting or head title, a subsitle, transmitted data or numerical values, and an end title exemplified at 36, 37, 38, and 39 by images of such data stored in the buffer memory block 19. The starting title 36 indicates the date and time of reception of the received traffic datum, the data originating exchange by the office code, such as PL3, an administrating code, such as #..711, and others. The subtitle 37 indicates the heading, such as the trunk group peg count TGP, with the heading preceded and succeeded by a pair of number marks. The transmitted data 38 represent trunk group peg counts measured for the respective routes of the route codes which are memorized in the fourth memory area 314 (FIG. 2) of the template data memory block of the data originating exchange. The end title 39 is similar to the starting title 36 except that the administrating code is counted up by one.

Figure 4A:
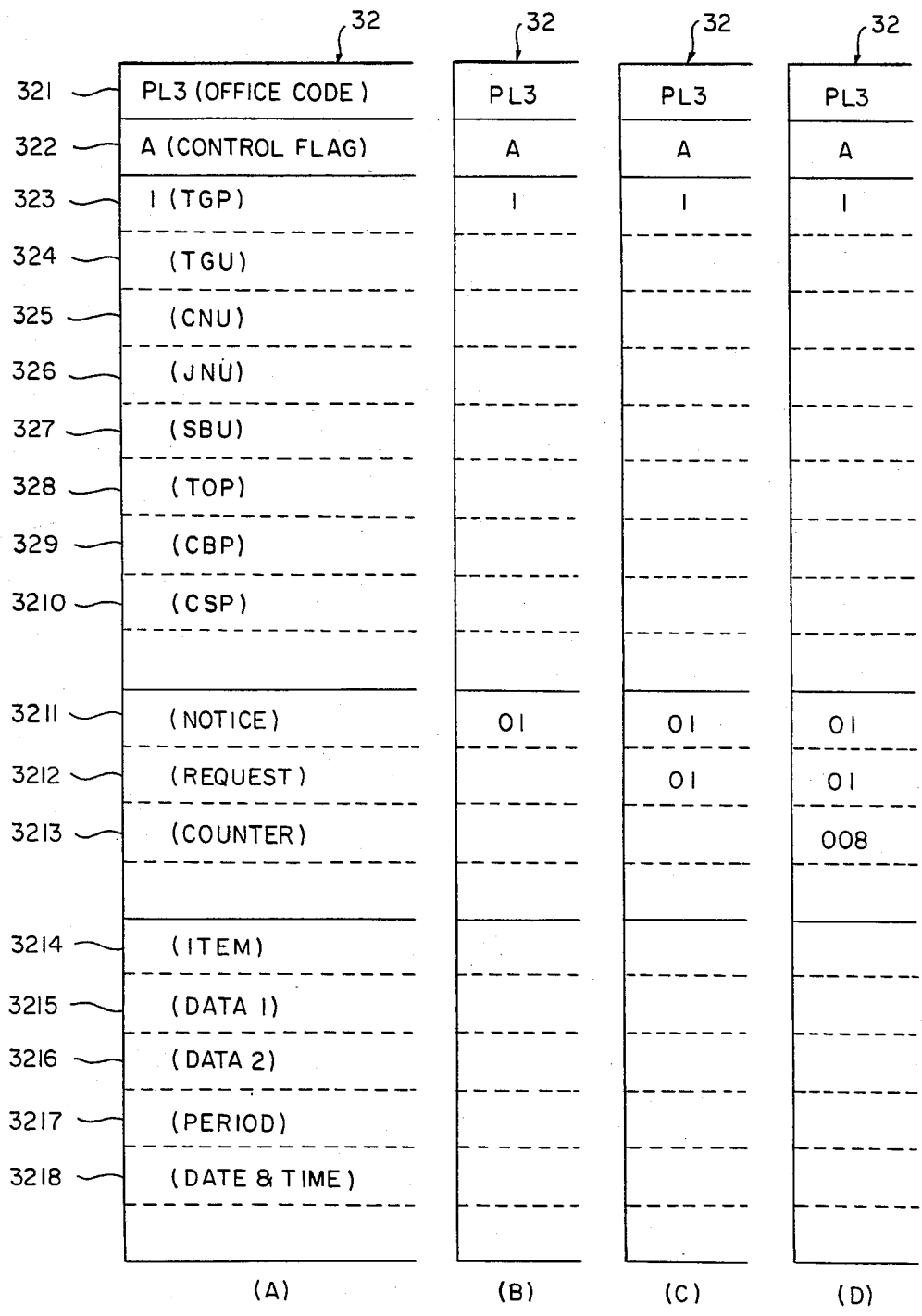
FIG. 4, drawn on two sheets FIG. 4 (a) and FIG. 4 (b), shows various stages of operation of a template data administrating table which is for use in the traffic data collecting arrangement illustrated in FIG. 1.
Figure 4B:
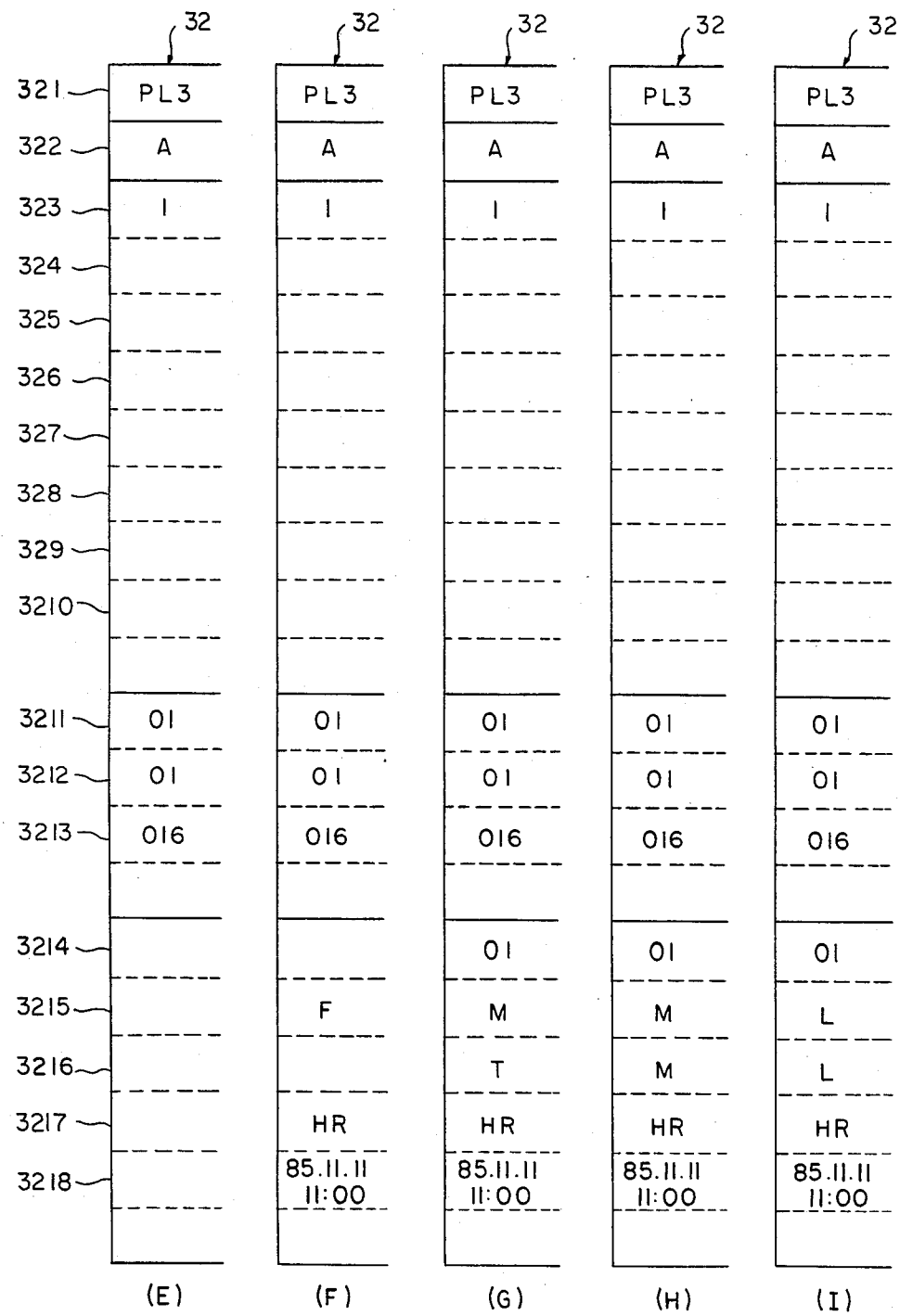

Referring now temporarily to FIG. 4, it should be noted at first that FIG. 4 consists of first through ninth figure parts A to I representative of the template data administrating table 32 in various stages of operation in the manner which will be described in the following. The template data administrating table 32 comprises a few memory subblocks. Each memory subblock is for a notice originating exchange from which the change notice and the changed datum following the change notice, are received by the center modem, such as the center modem 16, which is connected to the notice originating exchange through one of the data links. The memory subblocks of the template data administrating table 32 are therefore for those of the exchanges of the network to which may transmit the change notice either exactly concurrently or in immediate succesion before the center template data are not yet updated or renewed in the template data file 33 to the updated template data for the notice originating exchange.

In an example described hereunder, it will be assumed that the template data administrating table 32 is, although so called throughout the description, what should be termed a template and traffic data administrating table. The template data administrating table 32 comprises a plurality of memory subblocks which are assigned to the respective exchanges of the network and to several new exchanges which may be added to the network in future. In the manner depicted in each figure part, the memory subblock comprises first through fifth memory fields. Each memory field consists of one or more memory areas as will shortly be described. Contents of such memory areas will later become clear.

The first memory field consists of only a first memory area 321 for the office code of each exchange. Likewise, the second memory field consists of only a second memory area 322 for a control flag which will become clear as the description proceeds. On the other hand, the third memory field is for the item identification numbers memorized in the template data memory blocks, such as the template data memory block 31, of the exchanges of the network. The third memory field therefore consists of third through tenth memory areas 323 to 3210 and other memory areas which are not numbered merely for simplicity of description. The fourth memory field is for confirmation of renewal of the template data file 33 and comprises eleventh through thirteenth memory areas 3211 to 3213 and additional memory areas which are not herein numbered. The fifth memory field is for administration of the traffic data log file 17 with cooperation of the central processing unit 13 (FIG. 1) and comprises fourteenth through eighteenth memory areas 3214 to 3218.

Figures 5, 6:
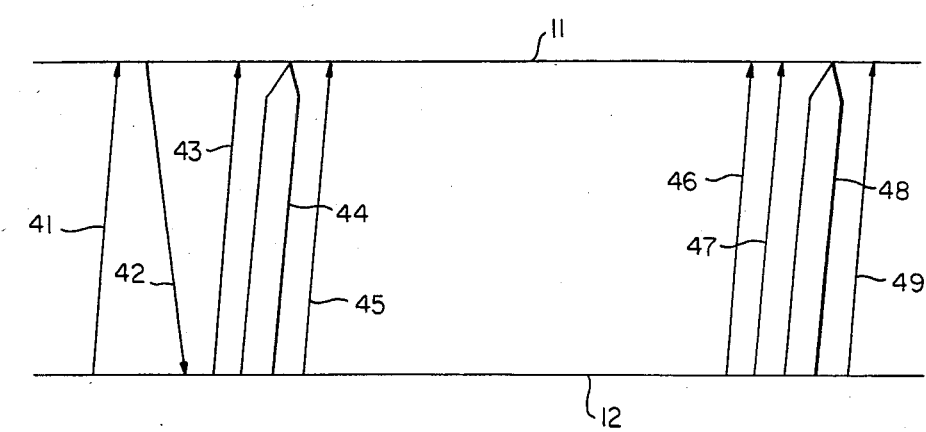
FIG. 5 shows a template data file used in the traffic data collecting arrangement depicted in FIG. 1.
FIG. 6 is a time chart for use in describing operation of the traffic data collecting arrangement shown in FIG. 1.

Turning to FIG. 5, the template data file 33 comprises a plurality of memory subblocks for the respective exchanges of the network and the new exchanges of the type described above. In this respect, the memory subblocks are similar in the template data administrating table 32 and in the template data file 33. Inasmuch as the template data file 33 keeps copies of the template data memory blocks, such as the template data memory block 31, of the respective exchanges of the network, each memory subblock of the template data file 33 comprises a plurality of memory sections which are similar to the memory sections described in conjunction with FIG. 2. The office codes of the respective exchanges must, however, be memorized in the memory subblocks.

More particularly, each memory section of the template data file 33 comprises first through fifth memory areas 331, 332, 333, 334, and 335. The first memory area 331 of each memory subblock is for the office code. Like in the template data memory block 31, the second memory area 332 of each memory section is for the item identification number. The third memory area 333 is for the data length. The fourth memory area 324 is for the item number, namely, for the number of route codes which are memorized in the fifth memory area 325.

Further turning to FIG. 6 and referring again to FIG. 1, it will be presumed that the exchange 12 transmits a change notice to the administrating center 11 at a first step 41. In response, the central processing unit 13 acts on the template data administrating table 32 in the manner which will later be described. The central processing unit 13 makes the center modem 16 transmit a request signal to the exchange 12 at a second step 42. In the example which will hereunder be described, the changed datum consists of a starting title, transmitted data or codes, and an end title like the transmitted template datum described in connection with FIG. 3. As noted above, the template data administrating table 32 will be used also on accumulating the transmitted traffic data in the traffic data log file 17.

The exchange 12 transmits the starting title of the changed datum to the administrating center 11 at a third step 43. In response, the central processing unit 13 acts on the template data administrating table 32. Immediately following the third step 43, the exchange 12 transmits the transmitted data of the changed datum to the administrating center 11 at a fourth step 44. Using the template data administrating table 32, the central unit 13 updates the template data file 32. The exchange 12 transmits the end title of the changed datum to the administrating center 11 at a fifth step 45. In response, the central processing unit 13 deals with the template data administrating table 32.

On the other hand, the exchange 12 transmits the starting title of the traffic date periodically, such as hourly, to the administrating center 11 in the manner exemplified at a sixth step 46. In response, the central processing unit 13 acts on the template data administrating table 32. The exchange 12 transmits the subtitle to the administrating center 11 at a seventh step 47. The central processing unit 13 again acts on the template data administrating table 32. At the sixth and the seventh steps 46 and 47, the central processing unit 13 stores the starting title and the subtitle in the traffic data log file 17. In the meantime, the exchange 12 transmits the transmitted data to the administrating center 11 at an eighth step 48 as the transmitted traffic datum for the traffic datum being transmitted. The central processing unit 13 deals with the template data administrating table 32 and stores the transmitted data in the traffic data log file 17. The exchange 12 transmits the end title of the traffic datum to the administrating center 11 at a ninth step 49. The central processing unit 13 deals with the template data administrating table 32 and stores the end title in the traffic data log file 17.

Figure 7A:
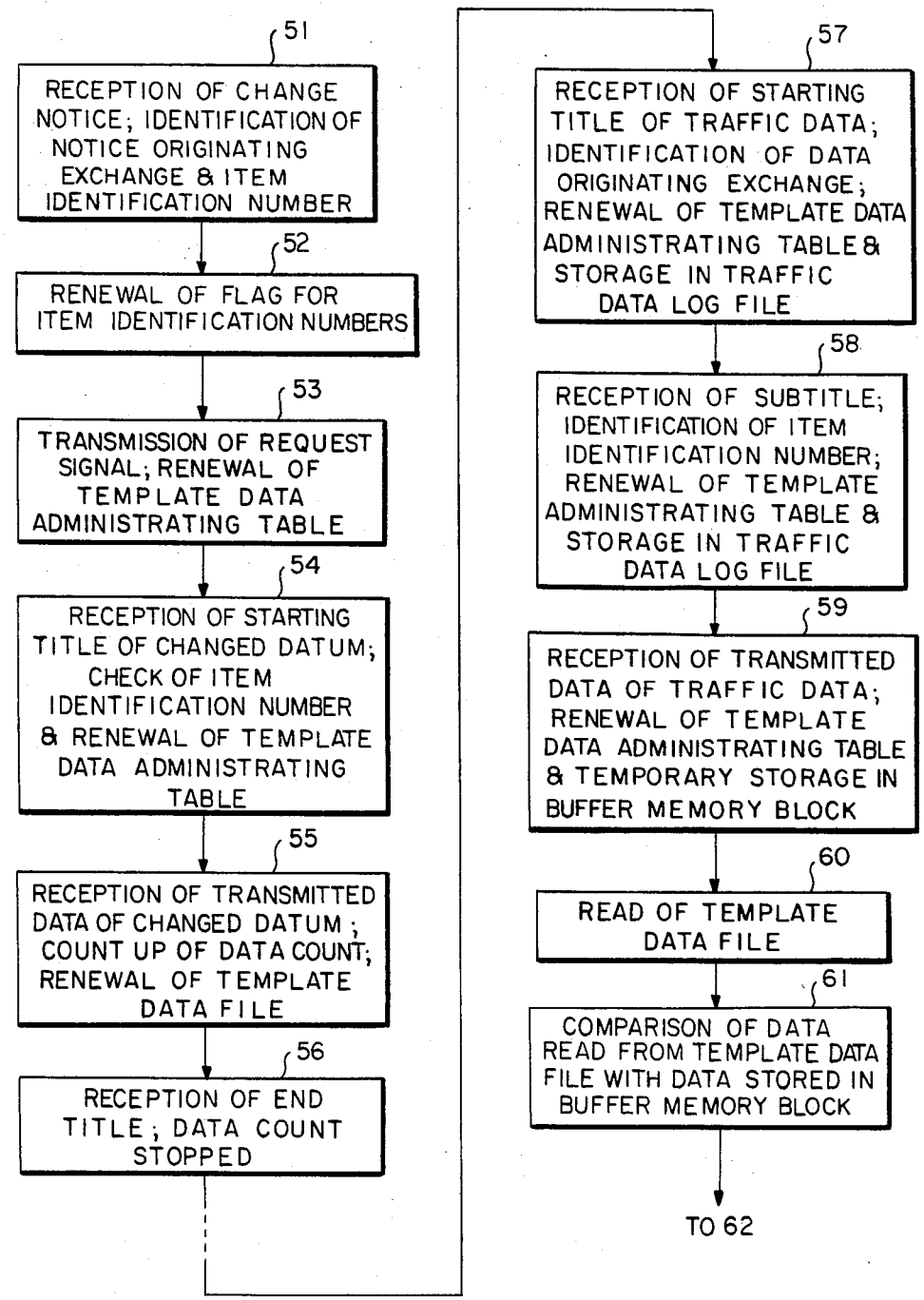
FIG. 7, depicted on one sheet and a half as FIG. 7 (a) and FIG. 7 (b), is a flow chart for use in describing operation of the traffic data collecting arrangement shown in FIG. 1.
Figures 7B, 8:
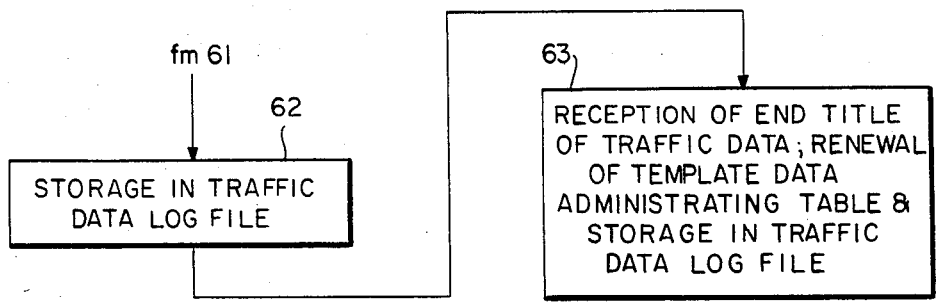
FIG. 8 shows images of data accumulated in a traffic data log file used in the traffic data collecting arrangement illustrated in FIG. 1.

Reference will now be had afresh to FIGS. 7 and 8 and again to FIGS. 1 through 6. In FIG. 7, the administrating center 11 receives the change notice from the exchange 12 at a first stage 51. In the manner described earlier, the central processing unit 13 identifies the exchange 12 as the notice originating exchange and detects the item identification number which is indicated by the change notice. It will be surmised that the exchange 12 has the office code PL3 and that the change notice indicates a number 01 as the item identification number to represent the trunk group peg count TGP as the heading of the items or of the exchange template data subjected to a change, namely, of the center template data in which a change is necessary. The central processing unit 13 refers to the second memory area 322 of the memory subblock assigned in the template data administrating table 32 to the exchange 12 to check whether or not a flag A is present in the second memory area 322 to indicate that the memory subblock under consideration is duly operable. The central processing unit 13 updates or rewrites the third memory field of the memory subblock at a second stage 52 to write a flag "1" as depicted in the first figure part A of FIG. 4 in the third memory area 323 which is assigned to the trunk group peg count TGP. While making the center modem 16 transmit the request signal to the exchange 12 at a third stage 53, the central processing unit 13 updates the eleventh memory area 3211 to write the item identification number 01 in the manner depicted in the second figure part B.

When the administrating center 11 receives the starting title of the changed datum at a fourth stage 54, the central processing unit 13 updates the twelfth memory area 3212 as depicted in the third figure part C of FIG. 4 to write the item identification number 01 for which the request signal is transmitted to the exchange 12. It will now be presumed that the transmitted data of the changed datum are sixteen in number as will shortly become clear. When the transmitted data are successively received at a fifth stage 55, the central processing unit 13 counts up a data count to update the thirteenth memory area 3213. Meanwhile, the central processing unit 13 updates the center template data to the updated template data in the template data file 33 by rewriting the route codes in the fifth memory area 335 of the memory section for the trunk group peg count TGP in the manner depicted in FIG. 3. In the fourth figure part D of FIG. 4, a number 008 is depicted as the data count to show the fact that eight route codes are received at this instant among all the route codes, sixteen in number, which should be updated.

When the end title of the changed datum is received at a sixth stage 56, the data count becomes 016 in the thirteenth memory area 3213 to a full data count as depicted in the fifth figure part E of FIG. 4. When compared with the item number memorized in the fourth memory area 334 of the memory section assigned in the template data file 33 to the item identification number 01, namely, to the trunk group peg count TGP, the full data count shows that a changed datum is completely substituted in the template data file 33 for one of the center template data that corresponds to the exchange template datum subjected to the change in the template data memory block 29.

Periodically, such as hourly, the traffic data are received from the exchange 12. It will readily be understood that the administrating center 11 is capable of receiving such traffic data simultaneously from a plurality of exchanges of the network. When the starting title of a transmitted traffic datum is received from the exchange 12 at a seventh step 57, the central processing unit 13 identifies as above the exchange 12 as the data originating exchange and updates the fifteenth memory area 3215 of the memory subblock assigned in the template data administrating table 32 to the exchange 12. At the same time, the central processing unit 13 updates the seventeenth and the eighteenth memory areas 3217 and 3218. In the example depicted in the sixth figure part F of FIG. 4, a code F (first datum), another code HR (hourly), and a date and time of reception of the starting title are written in the memory areas 3215, 3217, and 3218. Through the buffer memory block 19 depicted in FIGS. 1 and 3, the central processing unit 13 stores the starting title in the traffic data log file 17 in the manner illustrated in FIGS. 1 and 8.

Immediately following the seventh stage 57, the subtitle is received at an eighth stage 58. Although the heading may not be identical with the heading for which the template data file 33 is previously updated in the manner described above, it will be assumed merely for convenience of illustration that the received traffic datum is for the trunk group peg count TGP given the item identification number 01. The central processing unit 13 updates the fourteenth through the sixteenth memory areas 3214, 3215, and 3216 to "01" (the trunk group peg count TGP), a code M (middle data), and another code T (subtitle) as depicted in the seventh figure part G of FIG. 4. Furthermore, the central processing unit 13 stores the subtitle in the traffic data log file 17 (FIGS. 1 and 8) through the buffer memory block 19 (FIGS. 1 and 3).

Instantaneously subsequent to the eighth stage 58, the administrating center 11 receives the transmitted data of the transmitted traffic datum at a ninth stage 59. The central processing unit 13 updates the sixteenth memory area 3216 to write the code M as depicted in the eighth figure part H of FIG. 4. Moreover, the central processing unit 13 stores the transmitted data temporarily in the buffer memory block 19 depicted in FIGS. 1 and 3. The central processing unit 13 next reads the template data file 33 at a tenth stage 60 and compares the buffer memory block 19 with the template data file 33 as regards the office code, the item identification number, and others. The central processing unit 13 thereafter stores the transmitted data at a twelfth stage 62 in the traffic data log file 17 (FIGS. 1 and 8) together with the route codes read from the template data file 33.

The administrating center 11 now receives the end title of the transmitted traffic datum at a thirteenth stage 63. The central processing unit 13 updates each of the fifteenth and the sixteenth memory area 3215 and 3216 to write a code L (last datum) in the manner depicted in the ninth figure part I of FIG. 4. Furthermore, the central processing unit 13 stores the end title in the traffic data log file 17 (FIGS. 1 and 8) through the buffer memory block 19 (FIGS. 1 and 3).

It is now understood from the foregoing that the central processing unit 13 is coupled to the template data file 33 to update the center template data to the updated template data for each notice originating exchange by substituting the changed datum, or the received template datum, for one of the center template data that corresponds to the exchange template datum changed in the template data memory block, such as the template data memory block 31, to a changed datum in the notice originating exchange in question. Moreover coupled to the traffic data log file 17, the central processing unit 13 accumulates the traffic data received from the exchanges of the network in the traffic data log file 17 as the accumulated traffic data. On thus making the traffic data log file 17 keep the accumulated traffic data, the central processing unit 13 adds the updated template data to the respective traffic data for each originating exchange.

In the manner described in conjunction with FIG. 3 as regards the buffer memory block 19 and depicted in FIG. 8 for the traffic data log file 17, the accumulated traffic data are kept in the traffic data log file 17 together with the office code and the date and time of reception of each transmitted traffic datum from the data originating exchange. The central processing unit 13 can therefore make the supervisory terminal device 18 display, print, or otherwise produce the traffic data of a desired exchange and of a desired date and time together with the template data.

Alternatively, the traffic data log file 17 may keep the accumulated traffic data for the exchanges of the network without addition thereto of the updated template data but along with the office codes and the dates and times. It is necessary in this event that the template data file 33 should keep the updated template data during a certain interval of time together with the date and time of reception of each change notice in the manner which will presently be described. With this, the central processing unit 13 can make the supervisory terminal device 18 produce the traffic datum for a desired exchange and for a desired date and time from the traffic data log file 17 along with the template datum read from the template data file 33 with reference to the office code and the date and time.

As described before, the central processing unit 13 stores a full data count in the thirteenth memory area 3213 of the memory subblock assigned in the template data administrating table 32 to each notice originating exchange when the central processing unit 13 completes renewal of the template data file 33 in response to each changed datum. The full data count is kept in the template data administrating table 32 from a first time instant of completion of the renewal to a second time instant at which the central processing unit 13 detects receipt of another change notice from the notice originating exchange in question. It is therefore possible to understand that the full data count is an end code indicative of completion of renewal of the template data file 33 like the code L which is written in the fifteenth and the sixteenth memory areas 3215 and 3216 upon completion of storage of each received traffic datum in the traffic data log file 17.

Alternatively, one of the additional memory areas of the fourth memory field in the template data administrating table 32 may be used in storing such an end code upon receipt of the end title of each changed datum. When received from the notice originating exchange, the transmitted traffic data are stored in the traffic data log file 17 only when the end code is kept in the template data administrating table 32.

As a further alternative, such an additional memory area may be used in storing a date and time of receipt of each change notice like the eighteenth memory area 3218 which is updated upon reception of the starting title of each transmitted traffic datum as a received traffic datum. More specifically, the central processing unit 13 is coupled to the afore-described timing arrangement to detect first and second timing information which is generated by the timing arrangement when the central processing unit 13 updates the template data file 33 in response to a changed datum received from a notice originating exchange and when the central processing unit 13 loads the traffic data log file 17 with the transmitted traffic datum received from the data originating exchange which is identical with the notice originating exchange under consideration. The central processing unit 13 should store the first timing information in the template data file 33 in each instance of renewal of the template data file 33 and the second timing information in the traffic data log file 17 in response to receipt of the starting title of each received traffic datum.

Incidentally, it will readily be appreciated that the template data administrating table 32 can be left in the state depicted in the ninth figure part I of FIG. 3 until later reception of another change notice from the notice originating exchange for which the memory subblock under consideration is used. The control programs can readily be programmed for the central processing unit 13 with reference to the flow chart illustrated with reference to FIG. 7 and in consideration of operation so far described in connection with the central processing unit 13. Similarly, the control programs for the central control unit 23 can readily be programmed.

While this invention has thus far been described in specific conjunction with a single preferred embodiment thereof, it will now be readily possible for one skilled in the art to put this invention into practice in various other manners. For example, the template data administrating table 32 can be modified in various other ways. Above all, the transmitted data of each transmitted template datum may consist of only one or more route codes which are changed among all route codes of each changed datum. Depending on the circumstances, the route codes may be codes assigned to the speech and data channels.

What is claimed is:

1. In a traffic data collecting arrangement for a communication network which comprises a plurality of exchanges and an administrating center, each exchange including monitoring means for monitoring traffic data of said each exchange as monitored data, a traffic data memory for memorizing said monitored data as memorized data, and an exchange modem, said administrating center including center modems for the respective exchanges and a traffic data log file, the improvement wherein:

said each exchange comprises a template data memory for memorizing exchange template data, and exchange control means coupled to said template data memory, said monitoring means, said traffic data memory, and said exchange modem for making said monitoring means monitor said traffic data according to said exchange template data and for making said exchange modem transmit said memorized data to said administrating center successively as transmitted traffic data and furthermore transmit a change notice to said administrating center whenever one of said exchange template data is changed to a changed datum;

said center modems receiving the transmitted traffic data of said exchanges as received traffic data, the center modem for said each exchange receiving said change notice as a received notice;

said administrating center comprising center control means coupled to said center modems for making the center modem for said each exchange transmit a request signal to said each exchange in response to said received notice;

said exchange control means being furthermore for making said exchange modem transmit said changed datum to said administrating center as a transmitted template datum when said exchange modem receives said request signal;

the center modem for said each exchange receiving said transmitted template datum as a received template datum;

said administrating center further comprising a template data file for memorizing center template data which correspond to the exchange template data of said exchanges, said center control means being furthermore coupled to said template data file to update said template data file by substituting said received template datum for one of said center template data that corresponds to said one of the exchange template data, said center control means being furthermore coupled to said traffic data log file to accumulate said received traffic data in said traffic data log file as accumulated traffic data according to said center template data.

2. A traffic data collecting arrangement as claimed in claim 1, wherein:

said administrating center comprises a template data administrating table coupled to said center control means for memorizing an end code from a first time instant until a second time instant, said first time instant being a time instant at which said center control means updates said template data file, said second time instant being a time instant at which the center modem for said each exchange again receives a change notice as a result of a change of either of said one and another of the exchange template data in said template data memory;

said center control means accumulating the received traffic data of said each exchange only when said template data administrating table memorizes said end code.

3. A traffic data collecting arrangement as claimed in claim 2, wherein said center control means is for storing said center template data in said traffic data log file in addition to said accumulated traffic data.

4. A traffic data collecting arrangement as claimed in claim 2, wherein said administrating center comprises a terminal device coupled to said center control means, said template data file, and said traffic data log file for producing the accumulated traffic data of a selected one of said exchanges together with the center template data of said selected one of the exchanges.

5. A traffic data collecting arrangement as claimed in claim 1, said administrating center including timing means for generating timing information which varies from time to time, wherein said center control means is coupled to said timing means to detect first and second timing information which is generated by said timing means when said center control means updates said template data file and when said center control means stores in said traffic data log file the received traffic data of said each exchange, respectively, said center control means storing said first timing information in said template data file in addition to the center template data of said each exchange, said center control means storing said second timing information in said traffic data log file in addition to the accumulated traffic data of said each exchange.

* * * * *